(12) United States Patent
Xiao et al.

(10) Patent No.: US 10,969,865 B2
(45) Date of Patent: Apr. 6, 2021

(54) METHOD FOR TRANSMISSION OF EYE TRACKING INFORMATION, HEAD MOUNTED DISPLAY AND COMPUTER DEVICE

(71) Applicant: HTC Corporation, Taoyuan (TW)

(72) Inventors: Bo-Wen Xiao, Taoyuan (TW); Fu-Cheng Fan, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/683,268

(22) Filed: Nov. 14, 2019

(65) Prior Publication Data

US 2020/0166997 A1 May 28, 2020

Related U.S. Application Data

(60) Provisional application No. 62/771,145, filed on Nov. 25, 2018.

(51) Int. Cl.
*G06F 3/01* (2006.01)
*G06F 3/0482* (2013.01)

(52) U.S. Cl.
CPC ............ *G06F 3/013* (2013.01); *G06F 3/0482* (2013.01)

(58) Field of Classification Search
CPC combination set(s) only.
See application file for complete search history.

(56) References Cited

U.S. PATENT DOCUMENTS

| 7,850,306 | B2 | 12/2010 | Uusitalo et al. |
| 2010/0056274 | A1* | 3/2010 | Uusitalo ............... G02B 27/017 463/31 |
| 2016/0246384 | A1* | 8/2016 | Mullins ................... G06F 3/011 |

FOREIGN PATENT DOCUMENTS

| CN | 106796700 | 5/2017 |
| CN | 108427498 | 8/2018 |
| TW | 201616281 | 5/2016 |

OTHER PUBLICATIONS

"Office Action of Taiwan Counterpart Application", dated Jan. 8, 2021, p. 1-p. 4.

* cited by examiner

*Primary Examiner* — Deeprose Subedi
(74) *Attorney, Agent, or Firm* — JCIPRNET

(57) ABSTRACT

The disclosure provides a method for transmission of eye tracking information, a head mounted display and a computer device. The method includes: receiving visual content; receiving object information associated with each content object; displaying the visual content, and performing an eye tracking operation on a wearer of the head mounted display; determining, according to the object information of each content object, whether a gaze location corresponds to one of the content objects; and in response to determining that the gaze location corresponds to a first content object of the content objects, transmitting a first indicator associated with the first content object.

19 Claims, 3 Drawing Sheets

METHOD FOR TRANSMISSION OF EYE TRACKING INFORMATION, HEAD MOUNTED DISPLAY AND COMPUTER DEVICE

CROSS-REFERENCE TO RELATED APPLICATION

This application claims the priority benefit of U.S. provisional application Ser. No. 62/771,145, filed on Nov. 25, 2018. The entirety of the above-mentioned patent application is hereby incorporated by reference herein and made a part of this specification.

TECHNICAL FIELD

The disclosure relates to an eye tracking technique, and more particularly, relates to a method for transmission of eye tracking information, a head mounted display and a computer device.

BACKGROUND

In virtual reality (VR) systems, the eye-tracking technology is an indispensable element. In brief, the eye tracking technique can include the following steps: (1) illuminating an eye portion of a user with an uniform infrared light to correspondingly generate a glint point thereon; (2) capturing an infrared image of the eye portion of the user (which includes the above-mentioned glint point) by using an infrared lens; (3) obtaining a pupil location and other eye information by using eye ball algorithms including smoothing, denoising, dynamic compensation, motion compensation and the like through a computing unit.

Accordingly, it is an important issue for those skilled in the art to design a mechanism that consumes less bandwidth for transmission of eye tracking information.

SUMMARY

In view of this, the disclosure provides a method for transmission of eye tracking information, a head mounted display and a computer device, which can be used to solve the above technical problems.

The disclosure provides a method for transmission of eye tracking information, which is adapted to a head mounted display. The method includes: receiving first visual content, wherein the first visual content includes a plurality of content objects; receiving object information associated with each of the content objects; displaying the first visual content, and performing an eye tracking operation on a wearer of the head mounted display to obtain a gaze location of the wearer for the first visual content; determining, according to the object information of each content object, whether a gaze location corresponds to one of the content objects; and in response to determining that the gaze location corresponds to a first content object of the content objects, transmitting a first indicator associated with the first content object.

The disclosure provides a head mounted display, which includes a transceiver circuit, an eye tracking circuit and a processor. The processor is coupled to the eye tracking circuit and the transceiver circuit, and configured to: control the transceiver circuit to receive first visual content, wherein the first visual content includes a plurality of content objects; control the transceiver circuit to receive object information associated with each of the content objects; display the first visual content, and control the eye tracking circuit to perform an eye tracking operation on a wearer of the head mounted display to obtain a gaze location of the wearer for the first visual content; determine, according to the object information of each of the content objects, whether the gaze location corresponds to one of the content objects; and in response to determining that the gaze location corresponds to a first content object of the content objects, control the transceiver circuit to transmit a first indicator associated with the first content object.

The disclosure provides a method for transmission of eye tracking information, which is adapted to a computer device. The method includes: transmitting first visual content to a head mounted display, wherein the first visual content includes a plurality of content objects; transmitting object information associated with each of the content objects to the head mounted display; receiving a first indicator associated with a first content object from the head mounted display, wherein the first indicator indicates that a gaze location of a wearer of the head mounted display corresponds to the first content object; and generating second visual content according to the first indicator.

The disclosure provides a computer device, which includes a transceiver circuit and a processor. The processor is coupled to the transceiver circuit and configured to: control the transceiver circuit to transmit first visual content to a head mounted display, wherein the first visual content includes a plurality of content objects; control the transceiver circuit to transmit object information associated with each of the content objects to the head mounted display; receive a first indicator associated with a first content object from the head mounted display, wherein the first indicator indicates that a gaze location of a wearer of the head mounted display corresponds to the first content object; and generate second visual content according to the first indicator.

Based on the above, according to the method for transmission of eye tracking information proposed by the disclosure, after the first content object that the wearer is gazing at is detected, the head mounted display can generate the corresponding first indicator, and transmit the first indicator (e.g., the index value of the first indicator) to the computer device to notify the computer device that the wearer is currently gazing at the first content object. In this way, the disclosure can provide the eye tracking information to the computer device with less bandwidth consumption, and thus can achieve higher transmission efficiency.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Figure 1:
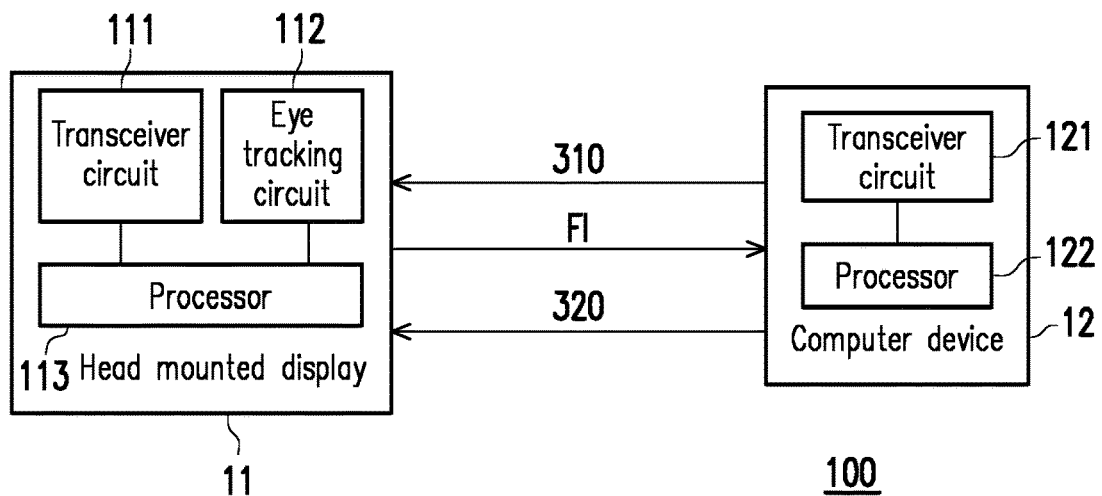

FIG. 1 is a schematic diagram illustrating a VR system according to an embodiment of the disclosure.

Figure 2:
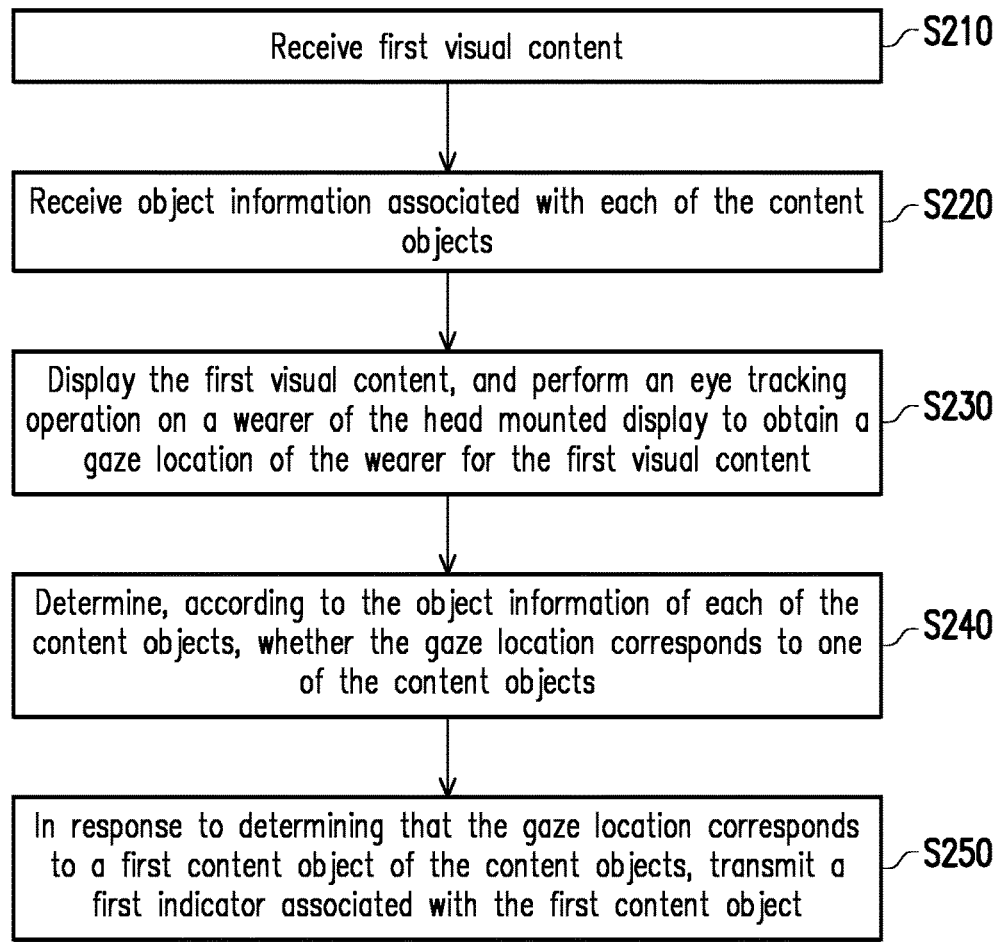

FIG. 2 is a flowchart illustrating a method for transmission of eye tracking information according to an embodiment of the disclosure.

Figure 3A:
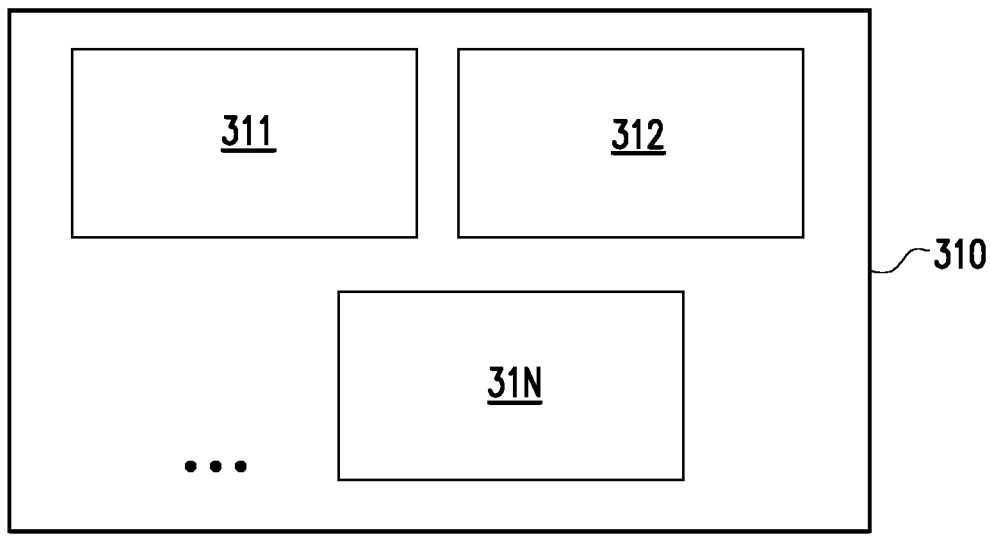

FIG. 3A is a schematic diagram illustrating first visual content according to an embodiment of the disclosure.

Figure 3B:
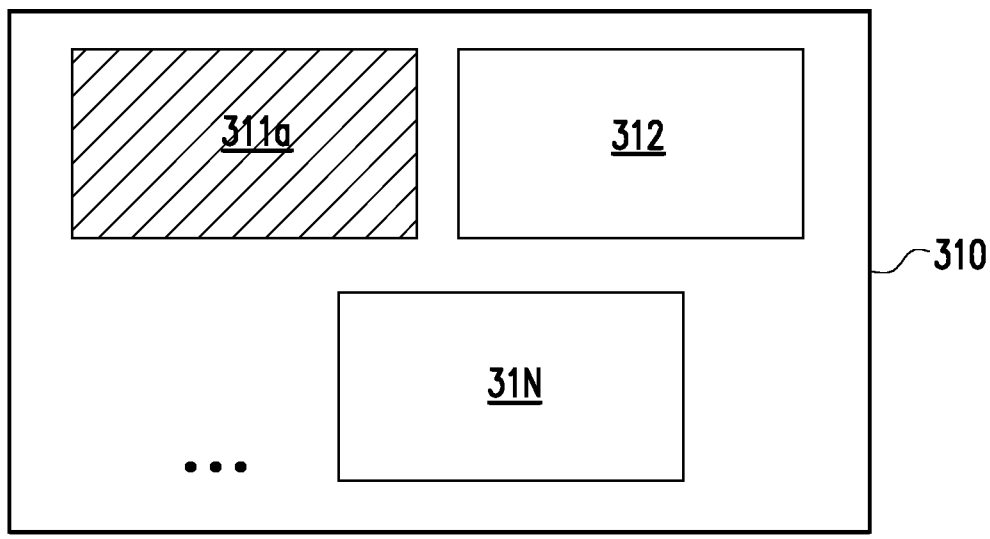

FIG. 3B is a schematic diagram illustrating second visual content according to FIG. 3A.

Figure 4:
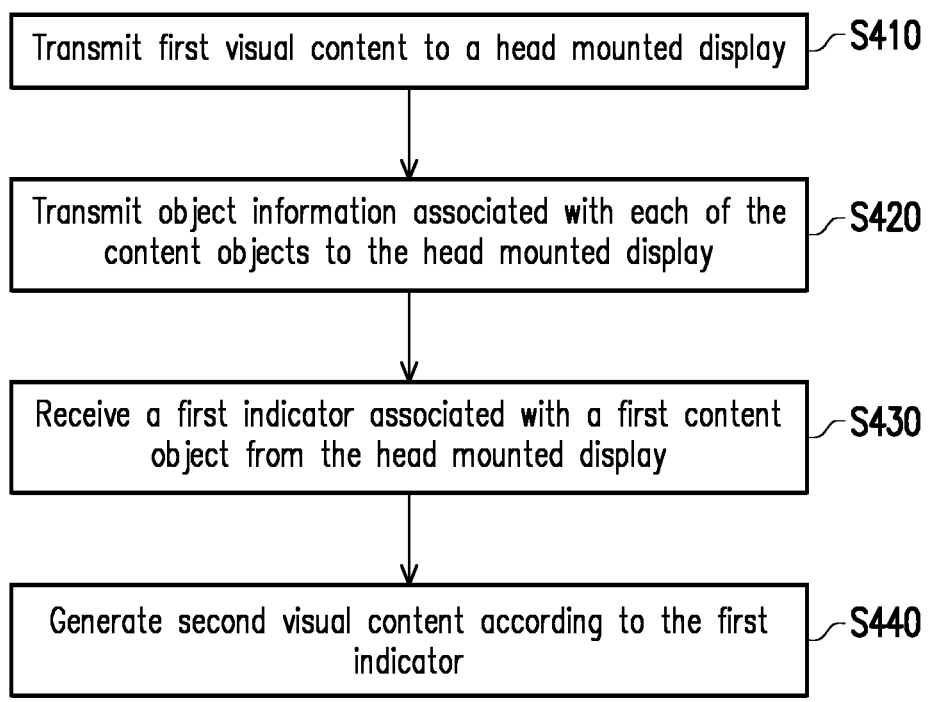

FIG. 4 is a flowchart illustrating a method for transmission of eye tracking information according to another embodiment of the disclosure.

DESCRIPTION OF THE EMBODIMENTS

Reference will now be made in detail to the present preferred embodiments of the disclosure, examples of which are illustrated in the accompanying drawings. Wherever possible, the same reference numbers are used in the drawings and the description to refer to the same or like parts.

Referring to FIG. 1, FIG. 1 is a schematic diagram illustrating a VR system according to an embodiment of the disclosure. As shown in FIG. 1, a VR system 100 includes a head mounted device 11 and a computer device 12. The head mounted device 11 may include, for example, a transceiver circuit 111, an eye tracking circuit 112 and a processor 113, and the computer device 12 may include, for example, a transceiver circuit 121 and a processor 122. In different embodiments, the transceiver circuit 111 can be connected to the transceiver circuit 121 by means of wired transmission or wireless transmission, so as to realize data transmission between the head mounted display 11 and the computer device 12. For example, the computer device 12 can be used to generate desired VR content to be transmitted to the transceiver circuit 111 of the head mounted display 11 via the transceiver circuit 121. Correspondingly, the head mounted display 11 can provide its wearer the aforementioned VR content. However, the disclosure is not limited in this regard.

In the head mounted display 11, according to the aforementioned eye tracking technique, the eye tracking circuit 112 can detect eye information of the wearer including, for example, a gaze location, a pupil location and the like, but not limited thereto. To this end, the eye tracking circuit 112 may include various types of hardware required to perform the aforementioned eye tracking technique, such as an infrared emitter, an infrared camera, and a computing unit for analyzing an infrared image. However, the disclosure is not limited in this regard.

The processor 113 may be coupled to the transceiver circuit 111 and the eye tracking circuit 112, and may be a processor for general purposes, a processor for special purposes, a conventional processor, a digital signal processor, a plurality of microprocessors, one or more microprocessors, controllers and microcontrollers which are combined with a core of the digital signal processor, an application specific integrated circuit (ASIC), a field programmable gate array (FPGA), any other integrated circuits, a state machine, a processor based on advanced RISC machine (ARM) and the like.

Further, in the computer device 12, the processor 122 may be coupled to the transceiver circuit 121, and various possible implementations of the processor 122 can refer to the related description of the processor 113, which is not repeated hereinafter.

In the embodiments of the disclosure, the processor 113 of the head mounted display 11 can implement the method for transmission of eye tracking information proposed by the disclosure by loading a specific module or program codes in cooperation with the processor 122 of the computer device 12. Detailed description of the above is further provided as follows.

Referring to FIG. 2, FIG. 2 is a flowchart illustrating a method for transmission of eye tracking information according to an embodiment of the disclosure. The method of this embodiment may be performed by the head mounted display 11 of FIG. 1, and each step of FIG. 2 will be described with reference to each element shown in FIG. 1. Further, in order to make the concept of the disclosure easier to understand, the following description is provided with reference to FIG. 3A and FIG. 3B.

First, in step S210, the processor 113 can control the transceiver circuit 111 to receive first visual content 310. In this embodiment, the first visual content 310 is, for example, a 2D/3D image or video in a VR service which may be provided by the computer device 12. However, the disclosure is not limited in this regard. Moreover, as shown in FIG. 3A, the first visual content 310 may include content objects 311, 312, ... , 31N, wherein each of the content objects 311 to 31N may be a button, an option in a menu, or other forms of VR objects. However, the disclosure is not limited in this regard.

Then, in step S220, the processor 113 can control the transceiver circuit 111 to receive object information associated with each of the content objects 311 to 31N. In an embodiment, the object information of each of the content objects 311 to 31N may be provided by, for example, the computer device 12, and may include a pixel distribution range of each of the content objects 311 to 31N in the first visual content 310. For example, if a certain portion of the pixels are located within the range of the content object 311, the computer device 12 can provide the distribution locations (which can be represented as coordinates) of the foregoing portion of the pixels of as the object information of the content object 311 to the head mounted display 11. However, the disclosure is not limited in this regard.

In addition, the object information of each of the content objects 311 to 31N may also include an index value (or may be understood as a serial number) of each of the content objects 311 to 31N. For instance, the index value (or the serial number) of the content object 311 is, for example, 1; the index value (or the serial number) of the content object 312 is, for example, 2; and the index value (or the serial number) of the content object 31N is, for example, N (which may be a positive integer, for example). However, the disclosure is not limited in this regard. In an embodiment, the object information of each of the content objects 311 to 31N may include an object location of each of the content objects 311 to 31N in the first visual content 310. Taking the content objects 311 and 312 as an example, their object locations are respectively located at the upper left and the upper right of the first visual content 310; nonetheless, this is simply an example and is not intended to limit possible implementations of the disclosure. In another embodiment, the object information of each of the content objects 311 to 31N may further include depth information of each of the content objects 311 to 31N in the first visual content 310.

Then, in step S230, the processor 113 can display the first visual content 310, and control the eye tracking circuit 112 to perform an eye tracking operation on a wearer of the head mounted display 11 to obtain a gaze location of the wearer for the first visual content 310. In an embodiment, the eye tracking circuit 112 can be configured to detect the gaze location of the wearer based on the infrared image of the eye portion obtained in the aforementioned manner. However, the disclosure is not limited in this regard.

After the gaze location of the wearer is obtained, in step S240, the processor 113 can determine, according to the object information of each of the content objects 311 to 31N, whether the gaze location corresponds to one of the content objects 311 to 31N. Then, in step S250, in response to determining that the gaze location corresponds to a first content object of the content objects, the processor 113 can control the transceiver circuit 112 to transmit a first indicator FI associated with the first content object. In an embodiment, the processor 113 can control the transceiver circuit 112 to transmit the first indicator FI associated with the first content object to the computer device 12. However, the disclosure is not limited in this regard.

For illustrative convenience, the content object 311 is used as an example of the considered first content object; nonetheless, this is simply an example and is not intended to limit possible implementations of the disclosure. Moreover, based on the following teachings, those of ordinary skill in the art should be able to correspondingly understand the implementation in which the other content object is considered as the first content object.

In an embodiment, if the processor 113 determines that the gaze location of the wearer is located within the pixel distribution range of the content object 311, the processor 113 can regard the content object 311 as the first content object described above. That is, the processor 113 can determine that the wearer is gazing at the content object 311. Correspondingly, the processor 113 can control the transceiver circuit 112 to transmit the first indicator FI associated with the first content object (i.e., the content object 311) to the computer device 12.

In an embodiment, if the processor 113 determines that the gaze location of the wearer is located within the pixel distribution range of the content object 311 for a preset time (e.g., 2 seconds), the processor 113 can regard the content object 311 as the first content object described above. That is, the processor 113 can determine that the wearer has been continuously gazing at the content object 311 for the preset time described above. Correspondingly, the processor 113 can control the transceiver circuit 112 to transmit the first indicator FI associated with the first content object (i.e., the content object 311) to the computer device 12.

In an embodiment, the processor 113 can transmit the index value of the first content object as the first indicator FI to the computer device 12. In the above example, if the content object 311 is the first content object that the wearer is gazing at, the processor 113 can transmit the index value (e.g., 1) of the content object 311 as the first indicator FI to the computer device 12. More specifically, in this embodiment, the first visual content 310 and the object information corresponding to each of the content objects are transmitted from the computer device 12 to the head mounted display 11. Therefore, the computer device 12 can analyze a pixel location distribution covered by the first indicator FI according to the received first indicator FI and accordingly compute an approximate user gaze area according to the pixel location distribution. In another embodiment, the first indicator FI may be implemented by a table including the index value of each of the content objects 311 to 31N, and yet the processor 113 may have the index value corresponding to the first content object marked with a flag, which represents that the wearer is gazing at the first content object. In other words, if the content object 311 is the first content object, the processor 113 may mark the index value 1 with the flag in the table, and transmit the table as the first indicator FI to the computer device 12.

In yet another embodiment, the processor 113 can transmit the object location of the first content object as the first indicator FI to the computer device 12. Here, with the content object 311 taken as an example again, the processor 113 can transmit the object location (e.g., an upper lift corner) as the first indicator FI to the computer device 12. However, the disclosure is not limited in this regard.

Based on the received first indicator FI, the computer device 12 can accordingly perform a corresponding operation. For instance, if the first indicator FI indicates that the wearer is already gazing at the content object 311 and the content object 311 is an option button, the computer device 12 can correspondingly generate second visual content 320 as shown in FIG. 3B, and transmit the second visual content 320 to the head mounted display 11. As shown in FIG. 3B, the second visual content 320 includes another content object 311a corresponding to the content object 311, and yet the content object 311a is highlighted to indicate that the content object 311a is selected by the wearer. However, the disclosure is not limited in this regard.

Then, the computer device 12 can further generate other visual content to be displayed by the head mounted display 11 according to the selected content object 311a, so as to provide subsequent VR services. However, the disclosure is not limited in this regard.

Referring to FIG. 4, FIG. 4 is a flowchart illustrating a method for transmission of eye tracking information according to another embodiment of the disclosure. The method of this embodiment may be performed by the computer device 12 of FIG. 1, and each step of FIG. 4 is described below with reference to each element shown in FIG. 1.

First, in step S410, the processor 122 can control the transceiver circuit 121 to transmit the first visual content 310 to the head mounted display 11. In step S420, the processor 122 can control the transceiver circuit 121 to transmit the object information associated with each of the content objects 311 to 31N to the head mounted display 11. In step S430, the processor 122 can control the transceiver circuit 121 to receive the first indicator FI associated with the first content object from the head mounted display 11. In step S440, the processor 122 can generate the second visual content 320 according to the first indicator FI. In an embodiment, according to the pixel location distribution of the received first indicator FI in a current image frame, the computer device 12 can generate the approximate user gaze area obtained by computing the pixel location distribution, and perform rendering for the second visual content 320 with the gaze area as the center. In another embodiment, according to current object depth information in the first indicator FI, the computer device 12 can corresponding perform rendering for the second visual content 320. Details regarding each step of FIG. 4 may refer to the teachings in the foregoing embodiments, which are not repeated hereinafter.

In summary, according to the method for transmission of eye tracking information proposed by the disclosure, after the first content object that the wearer is gazing at is detected, the head mounted display can generate the corresponding first indicator, and transmit the first indicator (e.g., the index value of the first indicator) to the computer device to notify the computer device that the wearer is currently gazing at the first content object. Correspondingly, according to the first indicator, the computer device can learn that the wearer is currently gazing at the first content object, and accordingly generate the other visual content to be displayed by the head mounted display. As a result, compared to the conventional approach in which the pupil location, the related eye information or the eye infrared image are directly transmitted by the head mounted display, the disclosure requires less bandwidth consumption and thus achieves higher transmission efficiency.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A method for transmission of eye tracking information adapted to a head mounted display which communicates with a computer device, comprising:
    receiving, from the computer device, first visual content, wherein the first visual content comprises a plurality of content objects;
    receiving, from the computer device, object information associated with each of the content objects, wherein the object information is not part of the first visual content;
    displaying the first visual content, and performing an eye tracking operation on a wearer of the head mounted display to obtain a gaze location of the wearer for the first visual content;
    determining, according to the object information of each of the content objects, whether the gaze location corresponds to one of the content objects; and
    in response to determining that the gaze location corresponds to a first content object of the content objects, transmitting, to the computer device, a first indicator associated with the first content object and the object information of the first content object.

2. The method according to claim 1, wherein the object information of each of the content objects comprises a pixel distribution range of each of the content objects in the first visual content and an index value of each of the content objects in the content objects.

3. The method according to claim 2, wherein the object information of each of the content objects further comprises depth information of each of the content objects in the first visual content.

4. The method according to claim 2, wherein in response to determining that the gaze location is located within the pixel distribution range of the first content object, determining that the gaze location corresponds to the first content object.

5. The method according to claim 2, wherein in response to determining that the gaze location stays within the pixel for a preset time, determining that the gaze location corresponds to the first content object.

6. The method according to claim 2, wherein the step of transmitting the first indicator associated with the first content object comprises:
    transmitting the index value of the first content object as the first indicator.

7. The method according to claim 2, wherein the first indicator is a table that comprises the index value of each of the content objects, and only the index value of the first content object is marked with a flag.

8. The method according to claim 1, wherein the object information of each of the content objects comprises an object location of each of the content objects in the first visual content and an index value of each of the content objects in the content objects.

9. The method according to claim 8, wherein in response to determining that the gaze location corresponds to the object location of the first content object, determining that the gaze location corresponds to the first content object.

10. The method according to claim 8, wherein the step of transmitting the first indicator associated with the first content object comprises:
    transmitting the object location of the first content object as the first indicator.

11. A head mounted display, comprising:
    a transceiver circuit, which communicates with a computer device;
    an eye tracking circuit;
    a processor, coupled to the eye tracking circuit and the transceiver circuit, and configured to:
        control the transceiver circuit to receive, from the computer device, first visual content, wherein the first visual content comprises a plurality of content objects;
        control the transceiver circuit to receive, from the computer device, object information associated with each of the content objects, wherein the object information is not part of the first visual content;
        display the first visual content, and control the eye tracking circuit to perform an eye tracking operation on a wearer of the head mounted display to obtain a gaze location of the wearer for the first visual content;
        determine, according to the object information of each of the content objects, whether the gaze location corresponds to one of the content objects; and
        in response to determining that the gaze location corresponds to a first content object of the content objects, control the transceiver circuit to transmit, to the computer device, a first indicator associated with the first content object and the object information of the first content object.

12. A method for transmission of eye tracking information adapted to a computer device, which communicates with a head mounted display, comprising:
    transmitting first visual content to the head mounted display, wherein the first visual content comprises a plurality of content objects;
    transmitting object information associated with each of the content objects to the head mounted display, wherein the object information is not part of the first visual content;
    receiving a first indicator associated with a first content object and the object information of the first content object from the head mounted display, wherein the first indicator indicates that a gaze location of a wearer of the head mounted display corresponds to the first content object; and
    generating second visual content according to the first indicator.

13. The method according to claim 12, wherein the object information of each of the content objects comprises a pixel distribution range of each of the content objects in the first visual content and an index value of each of the content objects in the content objects.

14. The method according to claim 13, wherein the object information of each of the content objects further comprises depth information of each of the content objects in the first visual content.

15. The method according to claim 13, wherein the first indicator comprises the index value of the first content object.

16. The method according to claim 13, wherein the first indicator is a table that comprises the index value of each of the content objects, and only the index value of the first content object is marked with a flag.

17. The method according to claim 12, wherein the object information of each of the content objects comprises an object location of each of the content objects in the first visual content and an index value of each of the content objects in the content objects.

18. The method according to claim 17, wherein the first indicator comprises the object location of the first content object.

19. The method according to claim 12, further comprising:
    transmitting the second visual content to the head mounted display.

* * * * *